Jan. 18, 1966  W. J. SHATAS ETAL  3,229,907
ILLUMINATED COUNTER

Filed Dec. 12, 1962  3 Sheets-Sheet 1

INVENTORS
WILLIAM J. SHATAS
JOHN J. AMBROZAITIS
HOWARD EDWIN PIERCE, JR.

BY
*Mandeville & Schweitzer*
ATTORNEYS

Jan. 18, 1966  W. J. SHATAS ETAL  3,229,907
ILLUMINATED COUNTER

Filed Dec. 12, 1962  3 Sheets-Sheet 2

INVENTORS
WILLIAM J. SHATAS
JOHN J. AMBROZAITIS
HOWARD EDWIN PIERCE, JR

BY Mandeville & Schweitzer
ATTORNEYS

Jan. 18, 1966  W. J. SHATAS ETAL  3,229,907
ILLUMINATED COUNTER
Filed Dec. 12, 1962  3 Sheets-Sheet 3
FIG. 5
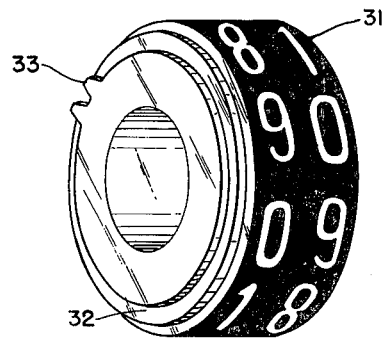
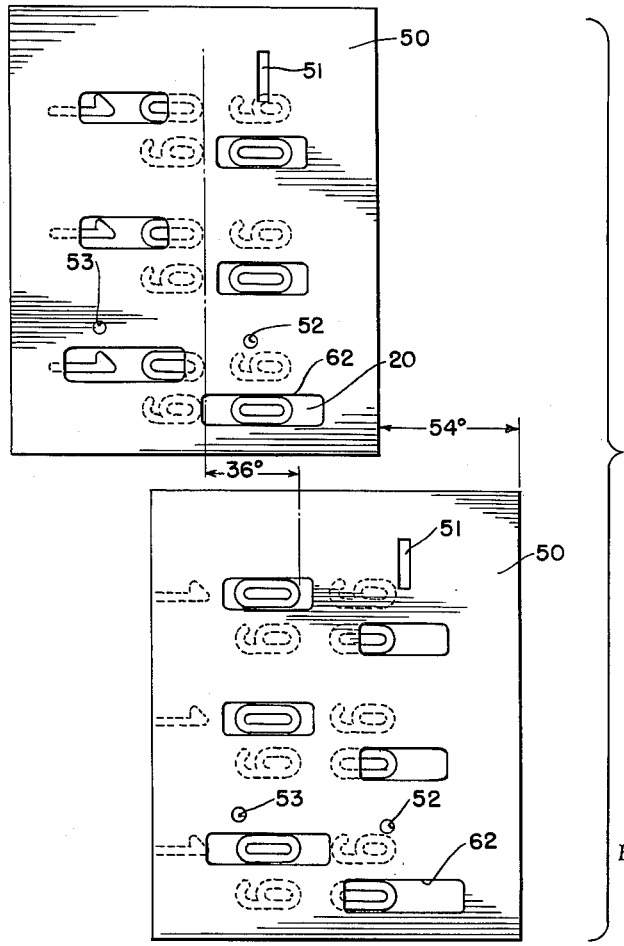
FIG. 6
INVENTORS
WILLIAM J. SHATAS
JOHN J. AMBROZAITIS
HOWARD EDWIN PIERCE, JR
BY Mandeville & Schweitzer
ATTORNEYS

3,229,907
ILLUMINATED COUNTER
William J. Shatas, Middlebury, John J. Ambrozaitis, Waterbury, and Howard Edwin Pierce, Jr., Cheshire, Conn., assignors to Tri-Tech, Inc., a corporation of Connecticut
Filed Dec. 12, 1962, Ser. No. 244,069
15 Claims. (Cl. 235—117)

The present invention relates to transfer counters and the like, and more particularly to a novel and improved form of tens-transfer counter incorporating novel structural features providing improved, internal illumination and greater readability.

Included in the substantial instrumentation utilized in modern, high speed aircraft, for example, are so-called decimal read-out indicators, typically in the form of tens-transfer counters. Increasingly, in view of high speeds of aricraft operation, the large numbers of instruments to be observed, and the requirement for high accuracy and reliability, attention is being directed toward the design and construction of indicating instruments to enable them to read swiftly and with minimum opportunity of error. The present invention is directed specifically to improvements in ten-transfer counters enabling the indicia thereof to be read with great facility and accuracy.

In accordance with one of the specific and important aspects of the invention, a tens-transfer counter is provided which includes a plurality of counter drums, together with the usual mechanisms for driving and indexing the drums, in which means are provided for illuminating the drum indicia from the interior drum and in which the drums are formed of substantially transparent material having annular regions of effectively uninterrupted transparency. Advantageously, the drums are molded of "Lexan" polycarbonate resin (Lexan being a trademark of the General Electric Company), a material which has desirable structural properties as well as desirable transparency. The necessary gearing for driving and transfer is molded integrally with the drum or, at least, is so incorporated therein as to provide annular areas of effectively uninterrupted transparency. Thus, a source of illumination, located internally of the drum, is able to radiate uniformly to any observable portion of the surface area of the drum, so that indicating numerals may be illuminated with substantial uniformity and within the predetermined, narrow specifications frequently included in military requirements, for example.

Heretofore, while it has been the practice in some cases to form counter drums, in part, of transpartent material, the structure of the drums has included metal bearings and pins or similar members extending transversely through the drums at undesired places, which would cause shadows to be cast when the drum was lighted internally and which would cause a steadily rotating drum to "wink" and otherwise undesirably distract the observer. In accordance with the present invention, the "Lexan" polycarbonate resin has sufficiently desirable structural characteristics as to enable the drums to be of one-piece molded construction, provided with cylindrical internal bearing surfaces by which the drums are supported for rotation, and provided with molded gear teeth for effecting the necessary transfer of motion from one drum to another.

As a second and more specific aspect of the invention, a novel and improved, internally illuminated drum counter is provided, in which the number of counter drums exceeds the number of illuminating bulbs, the bulbs being of extremely small size and constituting, in effect, point sources of light, and the arrangement being such that substantially uniform illumination is provided to all of the drums of the example. Thus, in a specific, advantageous embodiment of the invention, three counter drums are illuminated internally by two bulbs, which are received internally of the outer drums of a series of three arranged in side-by-side relation. A partially reflecting, partially transmitting material is interposed between the bulbs and the outer drums, on the side of the bulbs toward the viewing area, while a highly reflecting material is arranged to direct light from the bulbs and from the beforementioned partially reflecting material into the center drum of the assembly. The arrangement is such that a uniform level of illumination is obtained readily in three drum counters, using two bulbs located generally at the ends of the assembly.

Another aspect of the invention resides in the provision of a tens-transfer counter of a bidirectional type, having drums calibrated to indicate above and below an "all zero" indication and having an improved automatic shutter arranged to shift from a "positive" indicia scale to a "negative" indicia scale, or vice versa, when the counter passes through its "all zero" position. While counters of this type, generally, are known, the counter of the present invention is specifically improved with respect to its readability, particularly as concerns the readability of the lowest order drum which, in the counter of the invention, is directly driven (rather than intermittently as are the higher order drums of a tens-tranfer counter). Specifically, the new counter incorporates an automatic viewing shutter, having first and second sets of viewing slots offset laterally for alignment with separate rows of indicia on each drum, and offset circumferentially in a non-overlapping configuration such that, by shifting the shutter in a circumferential direction, one or the other of the sets of viewing slots may be brought into a viewing position. And, specifically, the shutter of the new counter incorporates specially elongated viewing slots for the lower order drum, enabling more than one index numeral to be viewed at one time. In order to accommodate such special, elongated slots, and at the same time to maintain a non-overlapping relationship between the sets of viewing slots, the respective sets of slots are offset circumferentially a distance substantially greater than one index position (or 36°), an offset of about 54° having been found to be particularly advantageous. In conjunction with the aforementioned elongated viewing slot, the counter incorporates a novel, automatic actuating arrangement for the shutter such that, when the counter goes through its "all zero" position, involving a 36° rotation of the drums, the shutter is shifted circumferentially a distance significantly greater than 36° (advantageously 54°) to bring a second set of viewing slots into proper registration in the viewing station.

For a better understanding of the above and other advantageous features of the invention, reference should be made to the following detailed description and to the accompanying drawings, in which:

FIG. 5 is a perspective view of a novel and advantageous form of indicator drum incorporated in the counter of the invention;

FIG. 6 is a diagrammatic representation illustrating the viewing field of the new counter in developed form and in its alternative operation positions.

Figure 1:
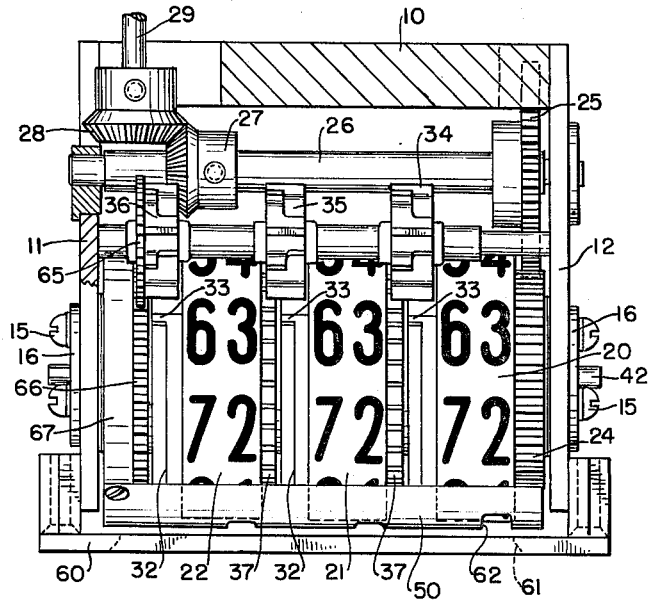
FIG. 1 is a top plan view, partly in section, of a tens-transfer counter incorporating the principles of the invention.

Referring now to the drawings, the reference numeral 10 designates a base plate, to the opposite ends of which are secured outwardly extending frame plates 11, 12. The frame plates 11, 12 have inwardly facing, circular recesses 13 (FIG. 3) in which is received a tubular counter shaft 14. The tubular shaft 14, which is advantageously formed of a material such as stainless steel, is rigidly secured in the frame plates 11, 12 by a plurality of screws 15 extending through insulated plates 16. As indicated particularly in FIG. 4, the tubular shaft 14 is slotted longitudinally at 17 and receives, in an enlarged outer portion 18 of the slot 17, an elongated lens 19, advantageously formed of a suitable glass or plastic material. For most applications, the lens is calculated to provide a red-colored illumination, when activated by a source of white light.

Journaled on the tubular shaft 14 are three counter or indicator drums 20–22, which are disposed in side-by-side relation, separated, if desired, by very thin washers 23. The drum 20 constitutes the lowest order drum and is driven by an attached gear 24 through an input system including a gear 25, shaft 26, bevel gears 27, 28, and an input shaft 29. The gear 24 is bonded, pinned, or otherwise secured to the side of the lowest order drum 20. However, in accordance with one aspect of the invention, if the gear 24 is secured by means such as the illustrated pins 30, the pins extend advantageously only a very limited distance into the side of the drum, leaving substantial annular areas extending from the interior to the exterior of the drum, which are uninterrupted by the pins. Alternatively, if the pins do extend entirely or substantially through the drum 20, the diameter and location of the pins are such, in relation to the size and location of the indicia numerals on the surface of the drum, that any shadows cast by the pins, from an internal light source, will fall between the numerals.

As indicated in FIG. 5, the indicator drums advantageously are provided with a translucent white coating, covered selectively by a wholly opaque outer coating 31, with the non-selected areas providing index numerals. (With the opaque general coating 31, the presence of limited shadows, falling wholly between the numeral areas, is not observable.) In the illustrated counter, each drum is provided with two rows of indicia, each row consisting of ten numerals (0–9) with one set of numerals being in ascending order with respect to rotation of the drum in a first direction, and the other set of numerals being arranged in ascending order with respect to rotation of the drum in the opposite direction. In addition, the "zero" positions of the respective sets of numerals are offset by one index position, or 36°, for purposes to be described.

Figure 2:
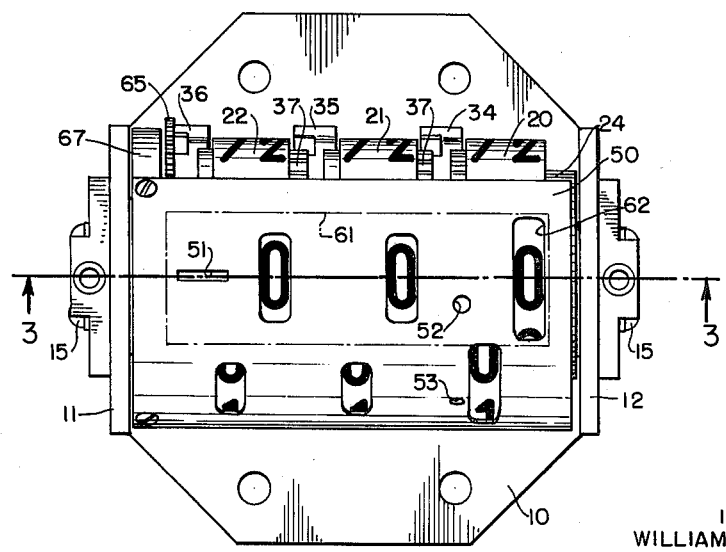
FIG. 2 is a front elevation of the counter of FIG. 1.

In FIGS. 1, 2 and 6, the counter drums are shown as having dark numerals on a light background, for convenience of illustration; it will be understood, however, that all of the drums advantageously are of the type shown in FIG. 5, being provided with white, translucent base coatings and opaque outer coatings forming background areas. The white base coating provides for advantageous internal reflection of light within the drums (particularly in the modification of FIG. 7, to be described), and thereby increases and renders more uniform the illumination of the numerals.

Each of the indicator drums 20–22 of the illustrated counter is provided along one side (its left hand side, as viewed in FIG. 3) with an integral annular locking surface 32 and an integral gear lug 33 (FIG. 5) consisting essentially of two gear teeth. The locking surface 32 and lug 33 of each drum are arranged for cooperation with one of a series of transfer gears 34–36 of a conventional Geneva-type transfer system. Thus, the transfer gears 34–36 each have two sections, one section consisting of a predetermined even number of teeth (e.g., 8) while the other section comprises only half as many teeth. The "half" portion of the transfer gear cooperates with the lug and locking surface of the adjacent indicator drum such that, when the drum reaches a predetermined indexing position and travels through the final 36° of a predetermined complete revolution, one of the teeth of the "half" section of the transfer gear is engaged by the lug 33, and the transfer gear is rotated through a predetermined angle, illustratively 90°. As the drum continues to rotate, the transfer gear is held immovable by the locking surface 32. While the foregoing is conventional as a mechanism, the particular construction of the device of the invention is unique in that the locking surface 32 and the lug 33 are formed of the "Lexan" polycarbonate resin, as an integral molded part of the uniting drum.

The higher order drums 21, 22, in addition to being provided with an integral locking surface and transfer lug, are provided with an integral, molded input gear 37 arranged for meshing engagement with the transfer gears 34, 35, the arrangement being such that, at the end of each revolution of a lower order drum, the drum of the next higher order is advanced through one index position, or through 36°.

In accordance with one aspect of the invention, a uniform and desirable level of illumination at each drum surface of a three-drum counter is provided by a novel arrangement of two internal illuminating bulbs 38, 39, disposed internally of the lowest and highest order drums 20–22 and associated with elements of predetermined transmission and reflecting characteristics to controllably limit the illumination of the lowest and highest order drums while controllably increasing the illumination of the intermediate drum, such that all drums are substantially uniformly illuminated. The particular importance of this arrangement, and the other arrangements of the invention leading toward uniform, predetermined illumination, may be understood by consideration of the military specifications regarding counter illumination, which require that illumination measures taken over several points of a single numeral fall within rigidly specified limits, which limits prevail for all numerals of all drums of the counter.

In the specific arrangement of the invention, bulbs 38, 39, of a commercially available, highly miniaturized design, are inserted within enlarged end recesses 40 in the tubular shaft 14, the bulbs being urged outward by springs 41, but being retained in the desired positions by the insulated discs 16, which carry electrical contact terminals 42. The position of the bulbs is determined primarily by the end surfaces of the contact pins 42, and these are so arranged as to locate the light-emitting centers of the bulbs directly within the lowest and highest order of counters 20–22.

Figure 4:
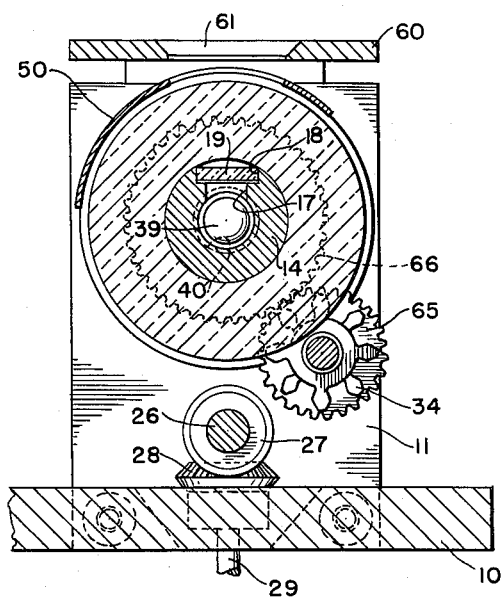
FIG. 4 is a cross-sectional view taken on line 4—4 of FIG. 3.

As indicated in FIG. 4, the longitudinal slot 17 in tubular shaft 14 is of sufficient width to provide for the illumination of at least one complete numeral, and advantageously more than one complete numeral. Thus, the slot advantageously permits illumination to be projected out of the shaft over an angle well in excess of 36°.

Figure 3:
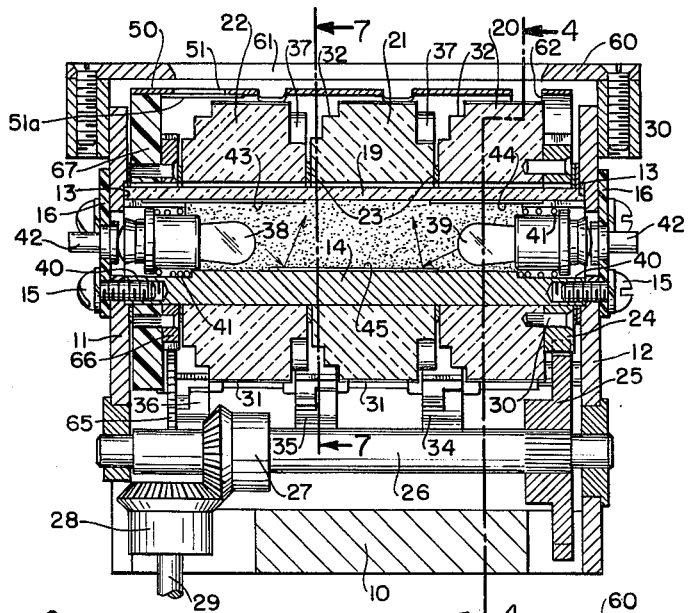
FIG. 3 is a cross-sectional view taken on line 3—3 of FIG. 2.

To prevent light from being transmitted with full efficiency from the bulbs 38, 39, outward into the interior of the drums 20, 22, strips 43, 44 of translucent masking tape (of a commercially available variety) are applied to areas of the lens 19 overlying the drums 20–22. The masking tape thus applied not only reduces the direct transmission of light into the drums 20–22, but also causes a substantial portion of the light to be reflected downward and inward, toward the opposite side of the tubular shaft 14 and into the region thereof underlying the central drum 21. In this central region, and on the "back" side of the tubular shaft, an area 45 of reflecting material is applied which may be reflecting tape, reflecting paint or the like, which is effective to redirect light, received either from the bulbs 38, 39 or as a reflected light from the tapes 43, 44, into the interior of the central drum 21. Actually, although the specific illustration of FIG. 3 shows the reflecting area 45 to be of limited scope, it may be sufficient to provide the entire interior of the tubular shaft 14 with a suitable reflecting surface.

Although the specific requirements of different counters may require somewhat different combinations of reflecting and transmitting ability of the tapes 43, 44, the reflecting nature of area 45, etc., depending on the specific geometry of the device, the power of the bulbs, the exact configuration of the drums, etc., the principle outlined appears to be valid for a wide variety of specific constructions requiring only minor empirical determinations to be made for realization of optimum results in specific mechanisms of different design.

The counter of the invention is adapted for bidirectional operation, above and below predetermined "all zero" position, and advantageously is provided with a viewing shutter 50 operative alternatively as the counter displacement is one way or the other from its "all zero" position to reveal one or the other of two sets of indicia. In one position, the shutter displays a "minus" sign in the form of an opening 51 (FIG. 2), covered in the back with a translucent tape 51a (FIG. 3) and illuminated from the uncoated end and edge areas of the drums. In addition, the shutter advantageously may include a pair of circular openings 52, 53, representing decimal points, likewise covered in the back by translucent tape (not shown) and illuminated from uncoated edge areas of the drums.

As one of the features of significant advantage, the molded, transparent counter drums are coated only on their outermost cylindrical surfaces, which carry the indicating numerals. The end surfaces of the drums are left uncoated, as are the cylindrical surfaces forming the locking surface 32 and the bosslike projection in which the gear lug 33 is formed. This advantageous arrangement provides for desirable axial diffusion of light, for improved uniformity of illumination and, of perhaps greater importance, for the direct radial transmission of light through the uncoated cylindrical surfaces to provide for desired illumination of the "minus" sign 51 and the decimal points 52, 53. Some radial illumination is also derived through the gears 37, which constitute integral molded and uncoated parts of the transparent drums.

As indicated in FIG. 5, each drum is calibrated with two sets of numerals, one being arranged in ascending order with respect to one direction of drum rotation and the other being arranged in ascending order with respect to drum rotation in the opposite direction. In addition, the sets of numerals are offset, so that the "0" of one set of numerals is disposed adjacent the "9" of the other set of numerals.

In the assembled counter, a slotted masking plate 60 extends across the front of the counter frame and is provided with an opening 61 sufficiently long (measured axially of the drums) to enable the effective areas of the shutter 50 to be observed. The height of the slot is such as to enable one set of shutter slots to be viewed from top to bottom while wholly concealing the other set of shutter slots.

The masking plate 60 operates in conjunction with the shutter 50 to enable a single set of index numerals to be viewed from the front of the counter. Thus, as indicated in FIG. 2, the "minus" set of numerals is aligned with the opening 61, with the second set of shutter openings being concealed behind the face of the masking plate. The viewer of the counter in its illustrated condition thus is presented with a specific numeral indication, together with an illuminated "minus" sign.

As indicated particularly in FIGS. 2 and 6, the shutter slot 62 exposing part of the lowest order drum 20, is especially elongated, relative to the size and spacing of the indicator numerals, so that an indicator numeral will remain wholly visible even when the lowest order drum 20 has rotated substantially from a specific index position, and so that substantial portions of two numerals will be visible whenever one numeral is not wholly visible.

In this respect, it will be understood that the lowest order drum 20, unlike the higher order drums 21, 22, is driven "continuously" rather than by an intermittent, Geneva-type drive. Thus, the drum does not "jump" or transfer rapidly from one definite index position to another, but may move slowly from one position to another and may even stop between index positions. This often makes reading of a conventional indicator difficult and confusing, particularly under emergency circumstances. In the counter of the invention, however, a numeral of the lowest order drum is wholly visible for a substantial distance on either side of an exact index position. Moreover, when the numeral does partly disappear behind the shutter most of the approaching numeral is visible, which substantially precludes any confusion in the reading of the counter. Thus, a viewer observing the bottom section of the numeral "6" passing under the top of the shutter opening 62, would also observe the top portion of the numeral "5" approaching from below. Thus, he would immediately be aware that the counter was between 5 and 6, and not between 8 and 7, for example.

As will be understood, the separate rows of slots in the shutter 50 must be sufficiently separated, circumferentially, that one row of slots will be wholly concealed when the other is aligned with the opening 61 in the masking plate. Accordingly, in a counter of typical proportions, having indicator numerals extending over about 25° of circumference of the drums, and having elongated slots 62 extending over about 50° of drum surface, it is appropriate and necessary to separate the "negative" and "positive" rows of shutter slots by about 54°.

In accordance with one of the features of the invention, a novel arrangement is provided for automatically shifting the shutter 50 through an angle on the order of 54° while the counter is passing through its "all zero" position or, in other words, during a 36° rotation of the drums. The angle through which the shutter 50 is shifted may be somewhat more or less than 54°, depending upon the specific geometry of the counter, but is in any event well in excess of the 36° of rotation involved in passing through the "all zero" position. The advantageous arrangement of the invention is shown in the two-position illustration of FIG. 6. The top position shows the shutter and drums, with all drums in "0" positions and the shutter in a "minus" position. The bottom position shows the drums shifted 36° to new "0" positions, and the shutter 50 shifted 54° to bring the second set of shutter openings into alignment with the viewing axis. This axis bisects the "0" numerals in the top and bottom positions.

In a conventional Geneva-type counter, all of the counter drums are locked together between the "all nine" position and the "all zero" position. Thus, in a conventional bidirectional counter, it is customary to actuate the shutter exactly like a counter drum of an order higher than the actual highest order drum. When the counter indicating in a downward direction passes through its "all zero" position, all of the drums and the shutter are locked together for 36° of rotation, which normally would bring the drums into an "all nine" position. However, in the new position of the shutter, viewing slots are aligned with different portions of the counter drums, presenting a new "all zero" position and conditioning the counter for continued counting in ascending direction.

In the counter of the present invention, the viewing shutter is connected through a combination differential gear and transfer drive to the highest order drum, such that the shutter is rotated through a predetermined angle greater than 36° (54° in the illustrated mechanism) upon actuation of the counter through its "all zero" position. Thus, the transfer gear 36, cooperating with the highest order drum 22, has affixed thereto a pinion 65 which drives a gear 66 secured to a support bearing 67 for the shutter 50. And, in accordance with the invention, the drive ratio between the pinion 65 and the gear 66 is such that, in 90° of rotation of the transfer gear 36, which normally would produce 36° of rotation of a higher order counting drum, the bearing 67 and the shutter 50 supported thereby are rotated through 54°. Thereafter, the shutter remains locked in its shifted position through the normal locking action of the transfer gear 36.

The improved shifting mechanism is specifically advantageous in conjunction with the novel arrangement for providing an extended viewing slot 62 for the lowest order drum, as heretofore described.

Figure 7:
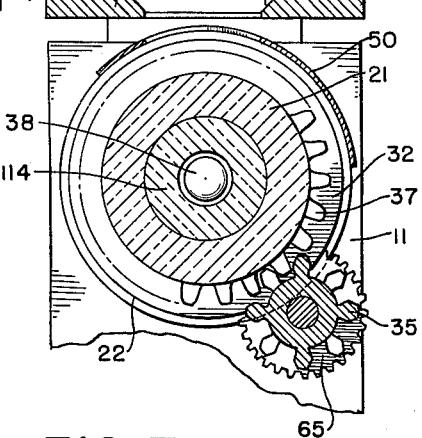
FIG. 7 is a fragmentary, cross-sectional view (as if taken along the line 7—7 of FIG. 3) of a slightly modified form of the new counter.

As an advantageous modification of the counter of FIGS. 1–6, the arrangement of FIG. 7 may be employed, in which the tubular bearing 14 of the first-described embodiment is replaced by a tubular bearing 114 of enclosed, cylindrical form and consisting of "Lexan" polycarbonate resin, having a transparency corresponding to that of the material used in forming the counter drums. In the modified arrangement, the "Lexan" counter drums are supported directly upon a "Lexan" bearing, the selected material having desirable physical characteristics for this purpose. The cylindrical "Lexan" bearing has certain advantages over the metal bearing 14 of the first-described embodiment, since it avoids the necessity of providing a separate light-emitting slot 17 and lens 19.

Normally, in the embodiment of FIG. 7, light would be emitted in all radial directions from the bulbs 38, 39. However selected portions of the interior surface of the bearing are suitably masked, in accordance with the principles previously explained, so that substantially uniform illumination of all three counter drums is provided. In fact, the uniformity of illumination is particularly apt to be realized in the modified arrangement of FIG. 7, since light is entering the interior of the counter drums in a variety of different directions and is dispersed widely throughout the drums and between drums by various reflecting and refracting surfaces provided by the drum configuration.

The new counter mechanism is particularly advantageous with respect to its ability to be read quickly and accurately under all conditions. Thus, in accordance with one of the specific aspects of the invention, the counter drums are formed completely of a molded "Lexan" polycarbonate resin which, in addition to having desirable physical or structural characteristics, has very advantageous transparency (75% to 85% light transmission through a ⅛ inch thick disc). The provision of molded "Lexan" counter drums, in conjunction with uniformly distributed, internal illumination assures the substantially uniform internal illumination of the indicating numerals on the surfaces of the counter drums. In actual commercial models of the new counter, the uniform level of illumination of the numerals falls well within the rigid, narrow limits established in military specifications.

Uniform illumination of the drums, and all other elements such as minus signs, decimal points, etc., provided in a viewing shutter or masking plate, is realized in part by providing exposed areas of the molded, transparent drums, permitting light to be transmitted radially onto the back surface of a viewing shutter and also permitting light to be transmitted axially from one counter drum to another of the assembly.

Taken together, the various features of the counter provide for a highly uniform internal illumination of a predetermined number of counter drums by a smaller number of illuminating bulbs and without any substantial variation or "winking" as the drums are rotated.

The mechanism of the invention also facilitates quick and reliable reading of the counter indicator by providing an elongated viewing slot for the lowest order drum and, in conjunction therewith, a novel shifting arrangement for the viewing shutter, enabling the shutter to be shifted through a substantially larger angle than the counter drums, as the drums are shifted through their "all zero" positions.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. An internally illuminated transfer counter or the like comprising
   (a) a tubular cylindrical support,
   (b) means for illuminating the interior of the support,
   (c) at least a portion of the support accommodating the transmission of light, and
   (d) an annular counter drum journalled for rotation on said support,
   (e) said drum being formed of substantially transparent material and having annular regions of uninterrupted transparency extending from the inner extremity to the outer extremity thereof,
   (f) said drum having coated outer surface portions forming indicia arranged to be illuminated from the interior of said support.

2. The counter of claim 1, in which
   (a) said drum is molded of a material having about 75% to 85% light transmission efficiency through a one-eighth inch thick section.

3. The counter of claim 2, in which
   (a) said tubular support is formed of a material having properties characteristic of the material used for said drum.

4. The counter of claim 1, in which
   (a) the outer surface of said drum is covered with a light transmitting coating, and
   (b) said light transmitting coating is covered in predetermined areas with a substantially opaque coating,
   (c) said indicia comprising uncovered portions of the light transmitting coating.

5. An internally illuminated transfer counter comprising
   (a) a plurality of counter drums of annular configuration and formed at least in part of light transmitting material,
   (b) a tubular cylindrical support received within said drums and journalling the drums in side-by-side relation,
   (c) an illuminating bulb received within the tubular support and generally directly underlying one of said drums,
   (d) shielding means for limiting the radial transmission of light to said one drum, and
   (e) reflecting means for increasing the radial transmission of light to an adjacent drum,
   (f) whereby the radial illumination of said drums is substantially uniform.

6. The counter of claim 5, in which
   (a) said shielding means comprises a reflecting material adapted to transmit a portion of the light directed thereon and to reflect a portion of such light.

7. The counter of claim 6, in which
   (a) said counter incorporates a viewing shield providing a limited area for viewing said drums,
   (b) said shielding means is interposed between said bulb and said one drum on the side of said bulb toward said viewing area, and
   (c) said reflecting means is positioned on the inner wall of said tubular support in substantial alignment with said adjacent drum and on the side of said bulb opposite said viewing area.

8. The counter of claim 7, in which (a) three counter drums are journalled in side-by-side relation on said support,
(b) illuminating bulbs are positioned generally directly within the outer two of said three drums,
(c) said shielding means is interposed between said bulbs and said outer drums, and
(d) said reflecting means is located generally within the inner one of said three drums.

9. A bi-directional tens-transfer counter comprising,
(a) a plurality of counter drums mounted for bi-directional rotation about a predetermined axis, each of said drums having a plurality of index positions,
(b) input means for driving the lowest order drum,
(c) transfer means connecting each lower order drum to a drum of the next higher order,
(d) a slotted viewing shield mounted adjacent said counter drums and having first and second sets of viewing slots aligned with first and second respective sets of index numerals on each of said counter drums,
(e) means mounting said viewing shield for limited rotational movement about the axis of said drums and into alternative operating positions to bring said sets of slots alternatively into viewing position,
(f) transfer means connecting said shield and the drum of the highest order whereby, upon rotation of said drum through an "all zero" position, said shield is shifted from one alternative position to another,
(g) the viewing slots associated with the lowest order drum being non-overlapping and circumferentially elongated relative to the other slots,
(h) said sets of viewing slots being spaced circumferentially a substantially greater angle than 36° the angle between adjacent index positions of the drum of the highest order, and
(i) said transfer means including gear means for shifting said shutter through said substantially greater angle upon actuation of the transfer means through one indexing movement.

10. The counter of claim 9, in which,
(a) said transfer means includes a differential gear assembly connecting the drum of the highest order to said viewing shutter.

11. The counter of claim 9, in which,
(a) said index numerals extend circumferentially over angles of about 25°,
(b) the elongated viewing slots associated with said lowest order drum extend circumferentially over angles of about 50°, and
(c) said gear means is arranged to shift said shutter through an angle in excess of 50°.

12. An internally illuminated transfer counter comprising
(a) a plurality of annular counter drums formed substantially of transparent material, each of said drums having a plurality of index position,
(b) means to support said drums for bi-directional rotation,
(c) means covering a part of the exterior of said drums and rendering predetermined areas thereof more opaque than others to provide two sets of indicating indicia on each drum,
(d) means including a viewing shutter mounted adjacent said drums and having two sets of viewing slots offset axially and circumferentially with respect to each other for alternative cooperation with one or the other of said sets of indicating indicia,
(e) the viewing slots associated with the drum of the lowest order being circumferentially elongated relative to the other viewing slots,
(f) means for illuminating the interior of said drums,
(g) each of said drums being of uninterrupted transparency from the inner to the outer extremities of the drum and throughout the entire circumferential extent of the drum,
(h) whereby the illuminated drums may be observed in rotation through one of said sets of viewing slots without significant instantaneous variation in illumination, and
(i) transfer means interconnecting said viewing shutter and the drum of the highest order for shifting the position of said viewing shutter when said drums pass through a zero position,
(j) whereby the illuminated drums may be observed in rotation through the other of said sets of viewing slots without significant instantaneous variation in illumination,
(k) said transfer means including gear means for effecting transfer movement of said viewing shutter through an angle substantially in excess of the angle between adjacent index positions of the drum of the highest order.

13. A transfer counter comprising
(a) a plurality of counter drums each having a plurality of index positions,
(b) means to support said drums for rotation,
(c) means covering a part of the exterior of said drums and rendering predetermined areas thereof more opaque than others to provide two sets of indicating indicia on each drum,
(d) means including a viewing shutter mounted adjacent said drums and having two sets of viewing slots for alternative cooperation with one or the other of said sets of indicating indicia,
(e) means located internally with respect to said drums for illuminating their interior,
(f) each of said drums having portions of uninterrupted transparency on the circumferential surface of the drum,
(g) whereby the illuminated drums may be observed in rotation through one of said sets of viewing slots without significant instantaneous variation in illumination, and
(h) transfer means interconnecting said viewing shutter and the drum of the highest order for shifting the position of said viewing shutter when said drums pass through a zero position,
(i) whereby the illuminated drums may be observed in rotation through the other of said sets of viewing slots without significant instantaneous variation in illumination,
(j) said transfer means including means for effecting transfer movement of said viewing shutter through an angle substantially in excess of the angle between adjacent index positions of the drum of the highest order.

14. An internally illuminated transfer counter comprising
(a) three annular counter drums formed substantially of transparent material in side-by-side relation,
(b) means including a tubular cylindrical element extending through and engaging the interior walls of said drums for supporting the same for rotation,
(c) means for illuminating the interiors of each of said drums and including a plurality of illuminating bulbs arranged in the opposite ends of said tubular cylindrical element and substantially underlying the first and last of the three drums,
(d) each of said drums having portions of uninterrupted transparency extending from the inner to the outer extremities of the drum and throughout the entire circumferential extent of the drum,
(e) shielding means interposed between said illuminating bulbs and said drums to reduce light travelling generally radially from said bulbs to said first and last drums,
(f) reflecting means for redirecting some of the light from said bulbs generally radially into the center drum,
(g) whereby the illuminated drums may be observed in rotation without significant instantaneous variation in the levels of illumination of the respective drums, and
(h) means covering the exteriors of said drums and rendering predetermined areas thereof more opaque than others to provide illuminated surface indicia.

15. An internally illuminated transfer counter or the like comprising
(a) a plurality of annular counter drums in side-by-side relation, each of said drums being molded of a clear transparent plastic material,
(b) means for coaxially supporting said drums for rotation,
(c) transfer gear means interconnecting adjacent ones of said drums,
(d) at least a portion of said transfer gear means including gears molded integrally with said drums,
(e) means disposed along the axis of rotation of said drums for illuminating the interiors thereof,
(f) each of said drums having portions of uninterrupted transparency extending from the inner to the outer extremities of the drum and throughout the entire circumferential extent of the drum,
(g) whereby the illuminated drums may be observed in rotation without significant instantaneous variation in illumination, and
(h) means covering the exteriors of the drums and rendering predetermined areas thereof more opaque than others to provide illuminated surface indicia.

References Cited by the Examiner
UNITED STATES PATENTS

| | | | |
|---|---|---|---|
| 931,036 | 8/1909 | Clark | 240—1 |
| 1,170,480 | 2/1916 | Duffie | 235—23 |
| 1,815,722 | 7/1931 | Mills | 235—23 |
| 2,420,808 | 5/1947 | Bliss | 235—1.1 |
| 2,728,155 | 12/1955 | Hunter | 240—2.1 |
| 2,920,816 | 1/1960 | Greenhow | 235—1.3 |
| 3,010,652 | 11/1961 | Heuver | 235—117 |
| 3,030,017 | 4/1962 | Crooke | 235—117 |
| 3,033,446 | 5/1962 | Moss | 235—23 |

FOREIGN PATENTS 484,848   12/1953   Italy.

LEO SMILOW, *Primary Examiner.*